United States Patent
Yoshida et al.

(10) Patent No.: US 10,288,917 B2
(45) Date of Patent: May 14, 2019

(54) CHASSIS AND ELECTRONIC DEVICE

(71) Applicant: Fujitsu Client Computing Limited, Kanagawa (JP)

(72) Inventors: Hiroki Yoshida, Kawasaki (JP); Akio Yoshida, Kawasaki (JP); Sonomasa Kobayashi, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 150 days.

(21) Appl. No.: 14/976,054

(22) Filed: Dec. 21, 2015

(65) Prior Publication Data
US 2016/0238874 A1 Aug. 18, 2016

(30) Foreign Application Priority Data
Feb. 17, 2015 (JP) .................................. 2015-028876

(51) Int. Cl.
*G02F 1/1333* (2006.01)

(52) U.S. Cl.
CPC .................. *G02F 1/133308* (2013.01); *G02F 2001/133314* (2013.01); *G02F 2001/133322* (2013.01)

(58) Field of Classification Search
None
See application file for complete search history.

(56) References Cited

U.S. PATENT DOCUMENTS

| 6,166,788 A * | 12/2000 | Ha | G02F 1/133308 |
| | | | 345/905 |
| 6,330,148 B1 * | 12/2001 | Won | G06F 1/1616 |
| | | | 349/58 |
| 7,020,495 B2 * | 3/2006 | Han | G06F 1/1616 |
| | | | 345/30 |
| 2009/0180048 A1 | 7/2009 | Kim et al. | |
| 2009/0237586 A1 * | 9/2009 | Han | G02F 1/133308 |
| | | | 349/58 |
| 2011/0261538 A1 * | 10/2011 | Kawada | G06F 1/1601 |
| | | | 361/724 |
| 2014/0152907 A1 * | 6/2014 | Yokawa | H04N 5/64 |
| | | | 348/836 |
| 2014/0192290 A1 * | 7/2014 | Mori | G02F 1/133308 |
| | | | 349/58 |

(Continued)

FOREIGN PATENT DOCUMENTS

| JP | 05-341718 | 12/1993 |
| JP | 2003-167231 A | 6/2003 |

(Continued)

OTHER PUBLICATIONS

Office Action issued in corresponding Japanese Application No. 2015-028876 dated Aug. 14, 2018 (7 pages).

*Primary Examiner* — Edward J Glick
*Assistant Examiner* — Anthony G Quash
(74) *Attorney, Agent, or Firm* — Osha Liang LLP

(57) ABSTRACT

A first inner cover includes a plate portion that includes a first surface that is opposed to the back surface of a liquid crystal unit; and a second surface that is the surface at the opposite side of the first surface. The plate portion includes a boss that extends from the second surface in the thickness direction of the plate portion. Furthermore, the plate portion includes a recessed portion that has a predetermined area of the first surface recessed, including an area at the opposite side of the boss.

7 Claims, 9 Drawing Sheets

(56) References Cited

U.S. PATENT DOCUMENTS

2016/0033996 A1* 2/2016 Lee .................. G06F 1/1626
                                                    361/679.26

FOREIGN PATENT DOCUMENTS

| JP | 2005-121929 | 5/2005 |
| JP | 2006-227057 A | 8/2006 |
| JP | 2008-158269 A | 7/2008 |
| KR | 2009-0072294 A | 7/2009 |

* cited by examiner

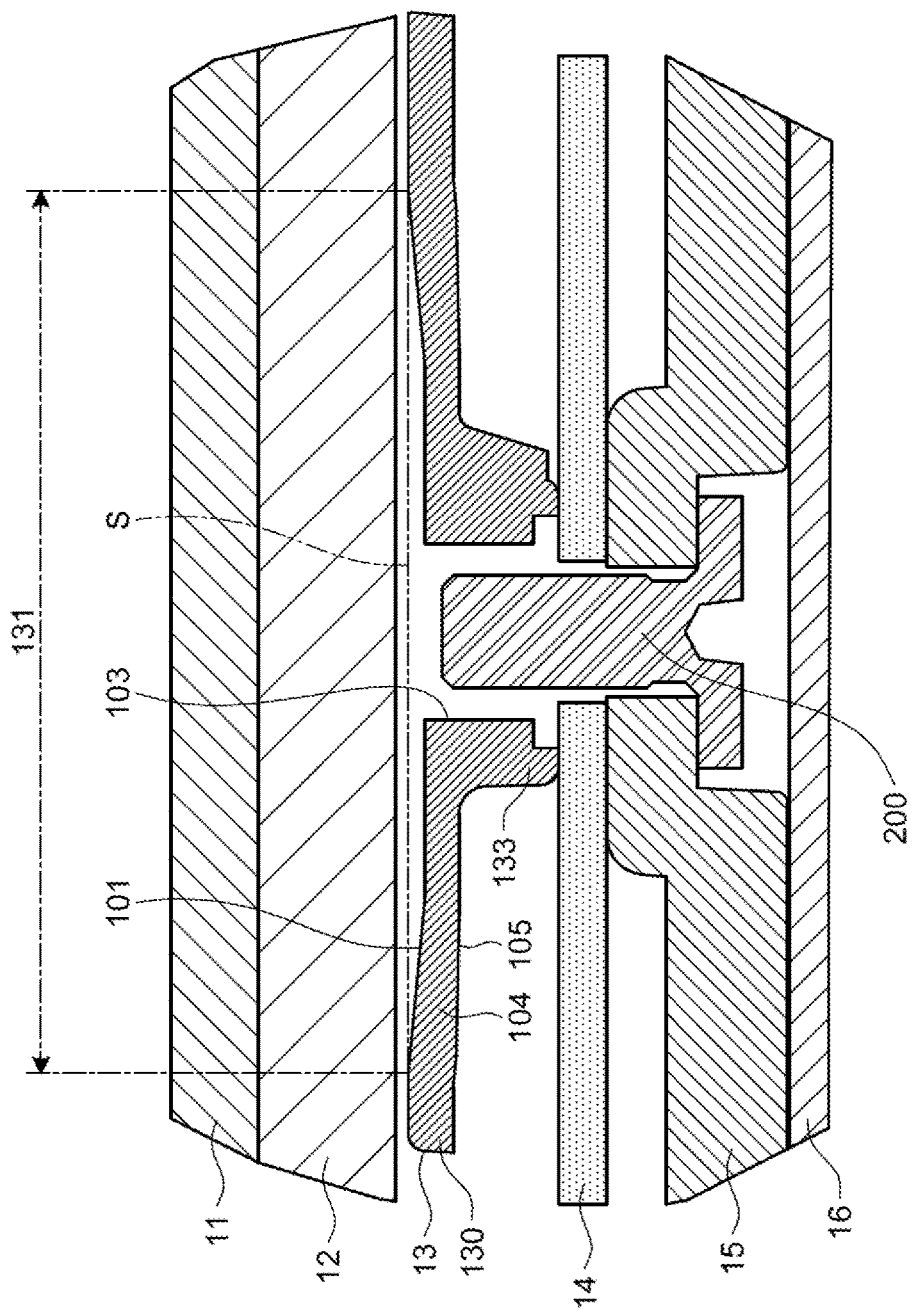

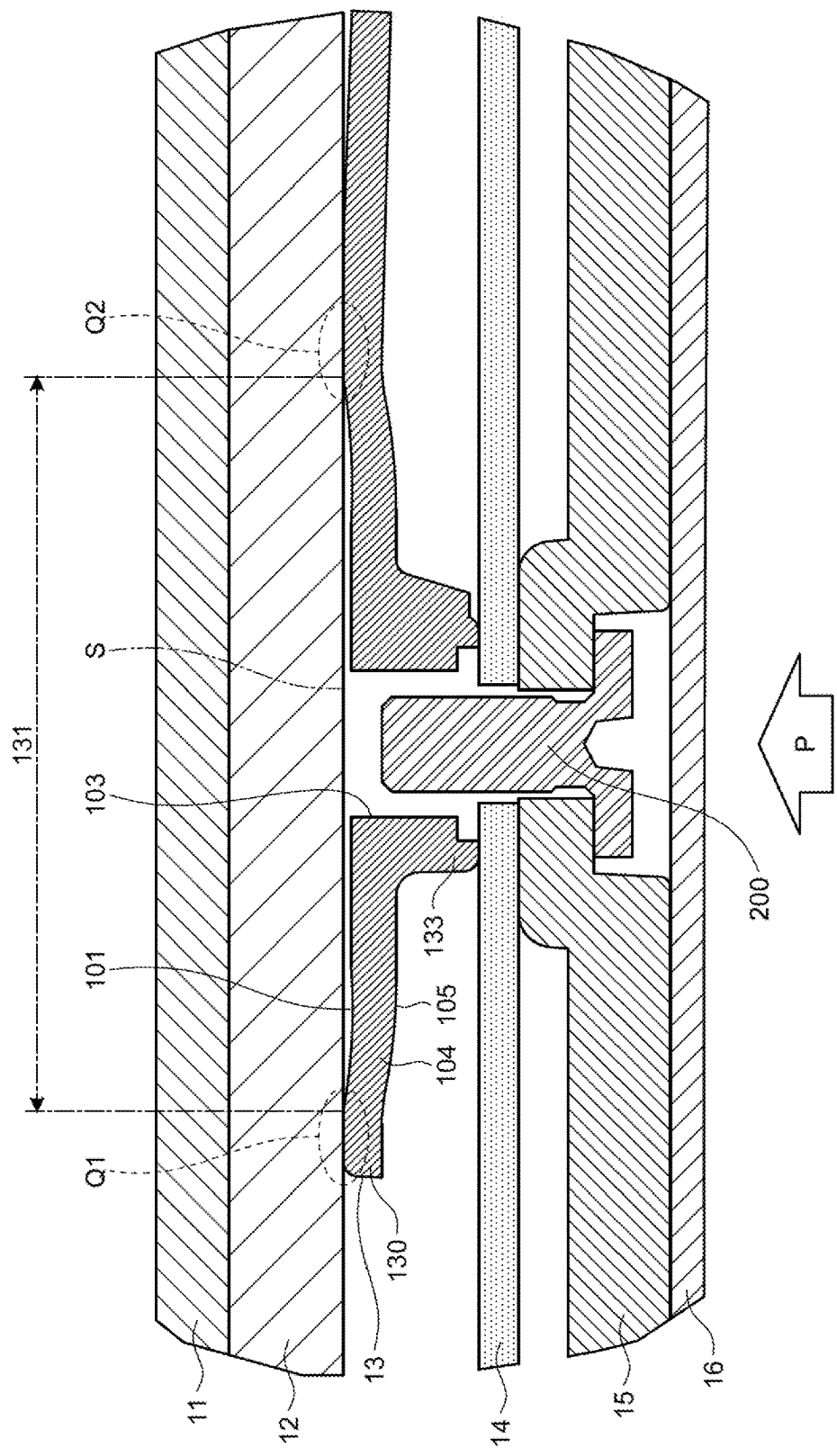

CHASSIS AND ELECTRONIC DEVICE

CROSS-REFERENCE TO RELATED APPLICATION

This application is based upon and claims the benefit of priority of the prior Japanese Patent Application No. 2015-028876, filed on Feb. 17, 2015, the entire contents of which are incorporated herein by reference.

FIELD

The embodiment discussed herein is directed to a chassis and an electronic device.

BACKGROUND

In recent years, portable electronic devices have become widely used, typically, notebook personal computers (PCs), tablet PCs, mobile phones, and smartphones. With regard to the portable electronic devices, there are high market demands for thin and lightweight products. For this reason, there are also high demands for electronic device chassis, which constitute a portable electronic device, to have thinness and lightweight properties and to have satisfying high rigidity in terms of protection for internal electronic components.

Typically, the chassis of a portable electronic device is formed by injection molding of synthetic resin. Furthermore, to provide the portable electronic device with rigidity, a structure component, such as a boss or rib, is formed within the chassis.

Furthermore, in portable electronic devices, a liquid crystal unit is often used as a display mechanism. Moreover, in portable electronic devices, to make the device thin, a boss is sometimes provided for screw fastening to fix a substrate or a unit on the back surface of the liquid crystal unit.

It is considered that, when an external force is applied to the chassis due to drop impact, pressing, or the like, a structure component, such as a boss, is brought into contact with the back surface of the liquid crystal unit. Display control mechanisms, such as an array substrate or a light guide plate, are provided on the back surface of the liquid crystal unit, and there is a possibility that the contact between the structure component and the back surface of the liquid crystal unit causes display failure or damage to the liquid crystal unit.

Conventionally, to prevent the occurrence of the above failure, a buffer material, such as rubber, is provided between the liquid crystal unit and the boss so that the force is distributed. Furthermore, there is a conventional technology in which, to change the view angle while the liquid crystal unit is held, a spherical member is fixed to the back surface of the liquid crystal unit, and the spherical member is fixed to a shaft screw via a tension spring. Moreover, there is a conventional technology in which the chassis, which houses a backlight unit in a liquid crystal layer, is provided with concavity and convexity so that the liquid crystal layer is sandwiched.

Patent Literature 1: Japanese Laid-open Patent Publication No. 5-341718

Patent Literature 2: Japanese Laid-open Patent Publication No. 2005-121929

However, according to the conventional technology for providing the buffer material, there is a possibility that, if the existing gap is filled with the buffer material, the impact is easily transmitted due to the pressure that is applied to the boss, and it is difficult to prevent the occurrence of failure of the liquid crystal unit. Furthermore, according to the conventional technology for using the spherical member, the spherical member is a mechanism that holds the liquid crystal unit in a movable state, and it is large-sized as it includes various components; therefore, in thin portable electronic devices, it is difficult to reduce the pressure that is applied to the boss. Moreover, according to the conventional technology for providing the chassis, which houses the backlight unit, with concavity and convexity, it is difficult to reduce the pressure to the structure component that is provided on the cover that spreads over the liquid crystal unit, and it is difficult to prevent the occurrence of failure of the liquid crystal unit.

SUMMARY

According to an aspect of an embodiment, a chassis includes a plate portion. The plate portion includes: a first surface that is opposed to a back surface of a liquid crystal unit; a second surface that is a surface at an opposite side of the first surface; a protruding portion that extends from the second surface in a direction away from the back surface of the liquid crystal unit and in a thickness direction of the plate portion; and a recessed portion that has a predetermined area of the first surface recessed, including an area of the first surface at an opposite side of the protruding portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an enlarged view of a boss section, taken along the line A-A' in FIG. 1A;

FIG. 7 is an enlarged view of the boss section, taken along the line A-A' in FIG. 1A in a state where the pressing force is applied;

DESCRIPTION OF EMBODIMENTS

Preferred embodiments of the present invention will be explained with reference to accompanying drawings. Here, the chassis and the electronic device, disclosed in the present application, are not limited to the following embodiment.

Figure 1A:
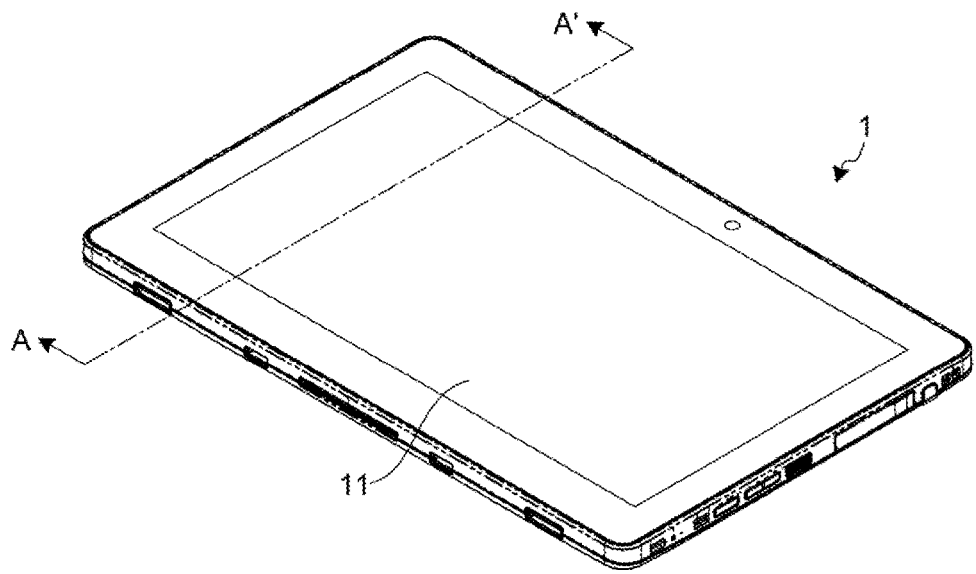
FIG. 1A is a perspective view of a tablet-type PC when seen from the side of a liquid crystal screen according to an embodiment.
Figure 1B:
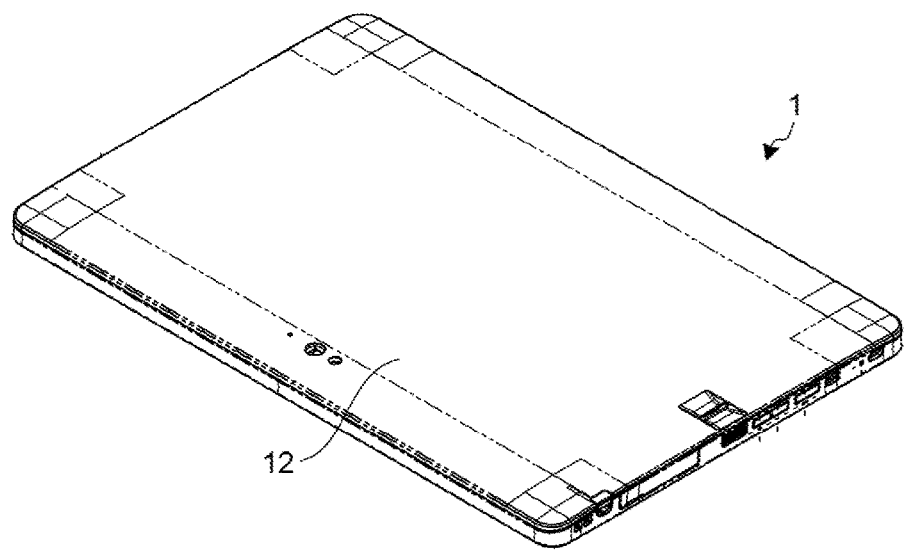
FIG. 1B is a perspective view of the tablet-type PC when seen from the side of an external cover according to the embodiment.
Figure 2A:
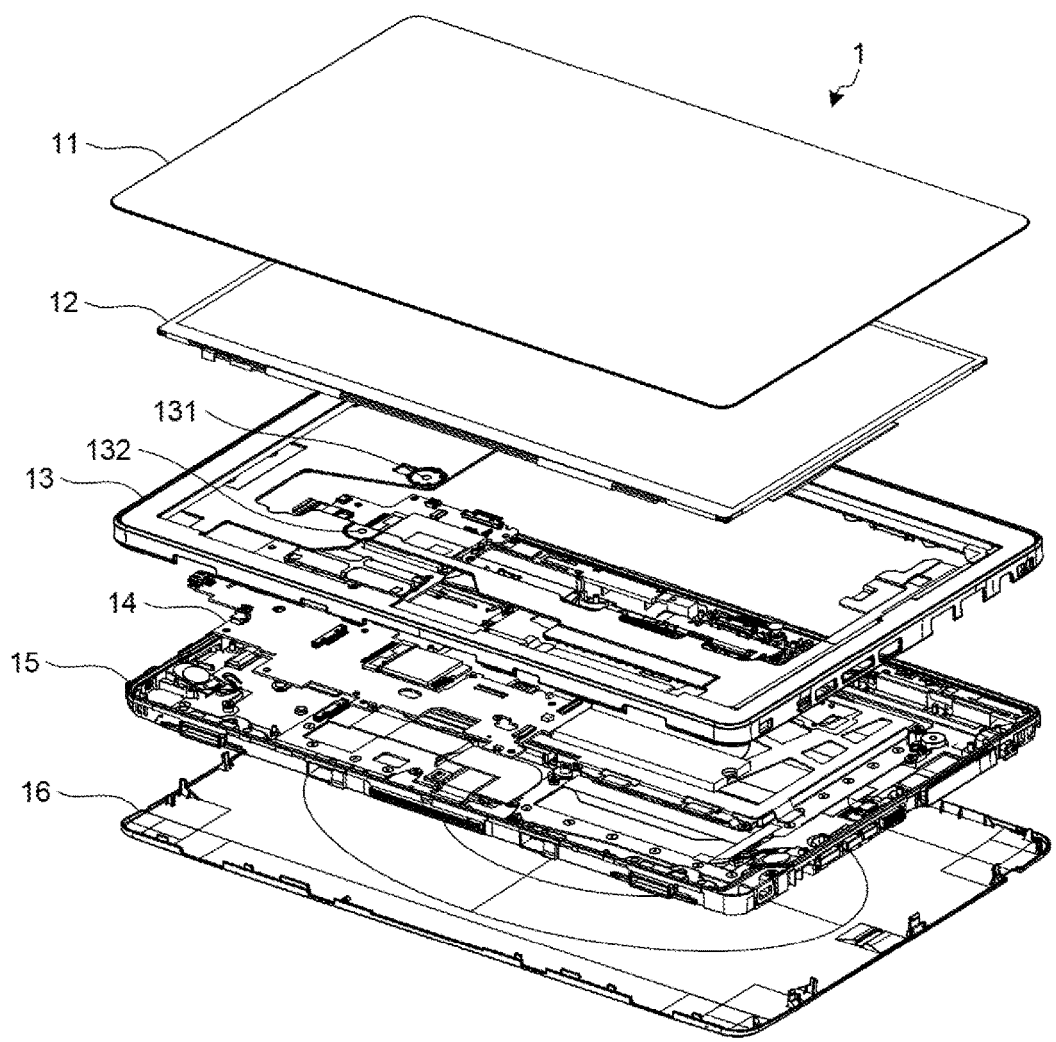
FIG. 2A is a perspective view of the tablet-type PC in an exploded state according to the embodiment.
Figure 2B:
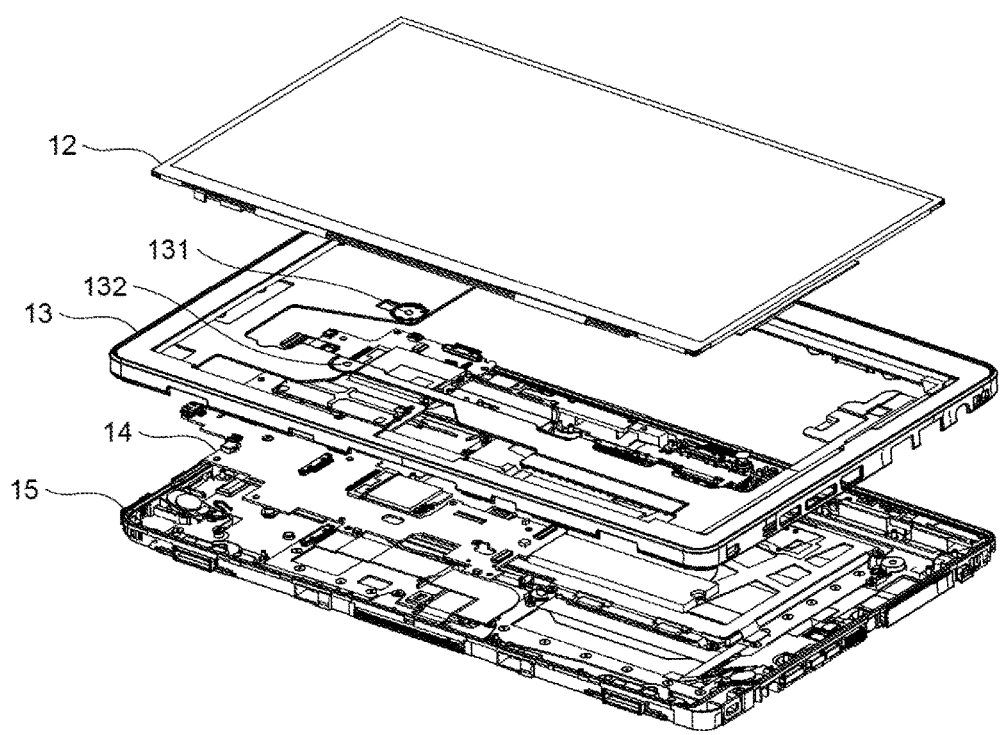
FIG. 2B is a perspective view where, in the exploded state, a liquid crystal unit, a first inner cover, a substrate, and a second inner cover are removed.
Figure 3A:
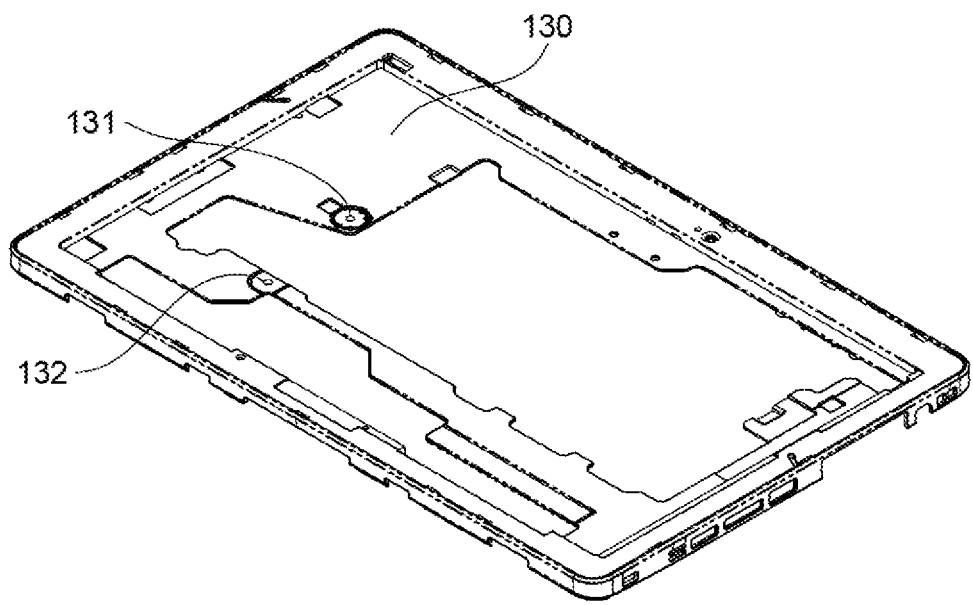
FIG. 3A is a perspective view of the first inner cover when seen from the side of the liquid crystal unit.
Figure 3B:
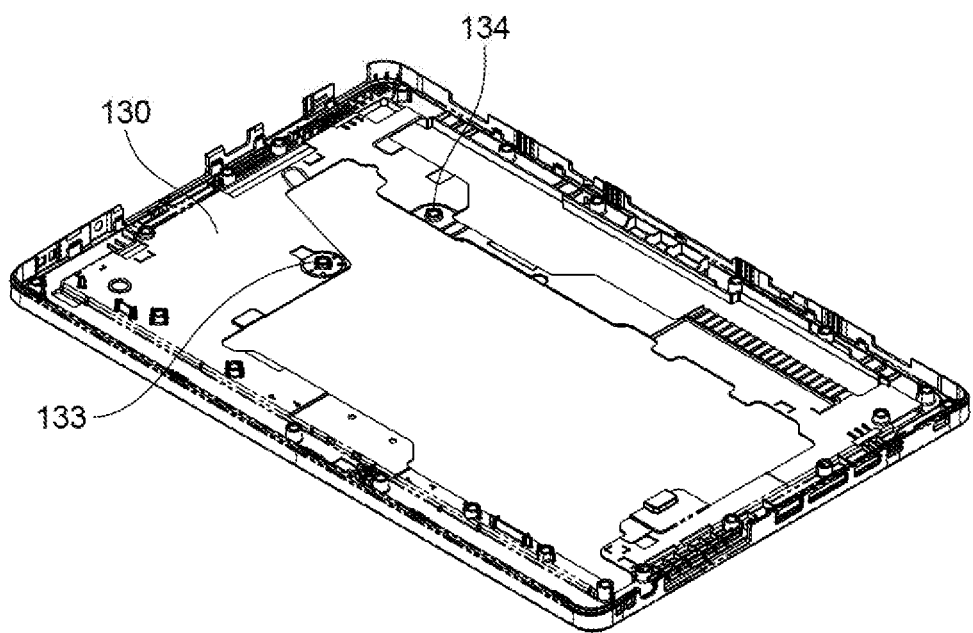
FIG. 3B is a perspective view of the first inner cover when seen from the side of the substrate.

FIG. 1A is a perspective view of a tablet-type PC when seen from the side of the liquid crystal screen according to an embodiment. FIG. 1B is a perspective view of the tablet-type PC when seen from the side of the external cover according to the embodiment. Furthermore, FIG. 2A is a perspective view of the tablet-type PC in an exploded state according to the embodiment. Furthermore, FIG. 2B is a perspective view where, in the exploded state, a liquid crystal unit, a first inner cover, a substrate, and a second inner cover are removed. Furthermore, FIG. 3A is a perspective view of the first inner cover when seen from the side of the liquid crystal unit. FIG. 3B is a perspective view of the first inner cover when seen from the side of the substrate.

With reference to FIG. 1A to FIG. 3B, an explanation is given of the schematic configuration of a tablet-type PC 1 in entirety. As illustrated in FIGS. 1A and 1B, the tablet-type PC 1 includes a surface at the side of a touch panel 11 and a surface at the side of an external cover 16, which is at the opposite side of the touch panel 11. Hereafter, the surface at the side of the touch panel 11 is sometimes referred to as the "front surface", and the surface at the side of the external cover 16 as the "back surface".

Furthermore, if the tablet-type PC 1 is disassembled, the state is obtained as illustrated in FIGS. 2A to 3B. As illustrated in FIGS. 2A and 2B, the tablet-type PC 1 includes the touch panel 11, a liquid crystal unit 12, a first inner cover 13, a substrate 14, a second inner cover 15, and an external cover 16.

The touch panel 11 is provided on the liquid crystal screen of the liquid crystal unit 12. In the following explanation, the display screen of the liquid crystal unit 12 is referred to as the liquid crystal screen.

The liquid crystal unit 12 includes a display control mechanism, such as a polarization plate, an array substrate, or a light guide plate, or the like, in addition to a liquid crystal layer.

As illustrated in FIG. 2B, the first inner cover 13, the substrate 14, and the second inner cover are provided on the back surface of the liquid crystal unit 12, i.e., on the surface at the opposite side of the display screen.

The first inner cover 13 includes a frame into which the liquid crystal unit 12 is fitted, and it nips the liquid crystal unit 12 that is fitted in the frame. Furthermore, the substrate 14 is provided on the back surface of the first inner cover 13, i.e., on the surface at the opposite side of the liquid crystal unit 12. Moreover, the second inner cover 15 is provided on the back surface of the substrate 14, i.e., on the surface at the opposite side of the first inner cover 13.

As illustrated in FIGS. 3A and 3B, the first inner cover 13 includes recessed portions 131 and 132. Furthermore, the first inner cover 13 includes a boss 133 at the opposite side of the recessed portion 131, i.e., at the side of the substrate 14, and includes a boss 134 at the opposite side of the recessed portion 132. A plate portion 130 is a plate-like portion that is provided with the recessed portions 131 and 132 and the bosses 133 and 134 on the first inner cover 13 and that is opposed to the liquid crystal unit 12 and the substrate 14. The details of the structure of the first inner cover 13 are explained later.

The substrate 14 includes, for example, a central processing unit (CPU), a memory, and an interface for a hard disk and an external device. Furthermore, the CPU on the substrate 14 is connected to the touch panel 11 and the liquid crystal unit 12. The CPU receives operation information that is input from the touch panel 11 and performs an operation in accordance with the received operation information. Then, on the basis of the details of the operation, the CPU causes the liquid crystal screen of the liquid crystal unit 12 to display the information.

The substrate 14 is sandwiched between the first inner cover 13 and the second inner cover 15 so that it is secured. Here, the substrate 14 is fastened by a screw that is inserted from the side of the second inner cover 15.

More specifically, the first inner cover 13 and the second inner cover 15 are fastened with screws at the positions of the bosses 133 and 134. The screws are engaged with screw holes 103 that are provided in the bosses 133 and 134 so that the first inner cover 13 and the second inner cover 15 are fastened and the substrate 14 is fixed. Furthermore, the first inner cover 13 and the second inner cover 15 are fastened with multiple screws at the areas along the vicinity of the edge portions of the liquid crystal unit 12. For the screw fastening areas, bosses may be provided on the back surface of the first inner cover 13.

The external cover 16 is provided on the back surface of the second inner cover 15, i.e., at the opposite side of the substrate 14. The external cover 16 and the second inner cover 15 are fastened due to the engagement between a claw and a claw hole, or the like.

The external cover 16 is a cover that spreads over the surface at the opposite side of the liquid crystal screen of the tablet-type PC 1 to improve the external appearance and to protect the internal mechanisms, such as the liquid crystal unit 12 or the substrate 14.

The first inner cover or the combination of the first inner cover, the second inner cover, and the external cover is an example of the "chassis".

Figure 4A:
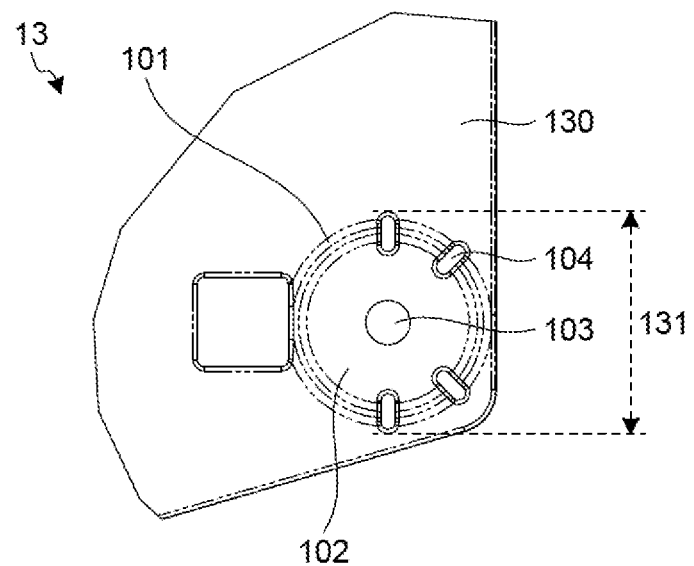
FIG. 4A is a plan view of a recessed portion.
Figure 4B:
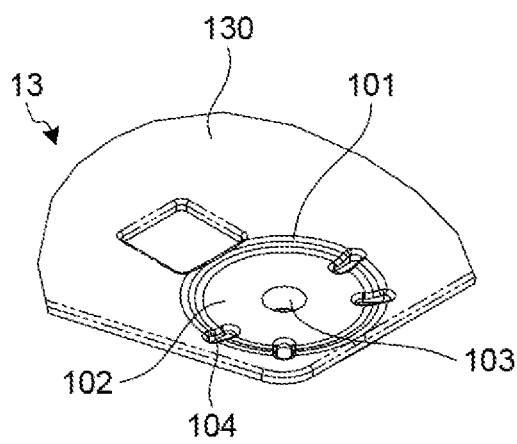
FIG. 4B is a perspective view of the recessed portion.

Next, a more detailed explanation is given of the structure of the first inner cover 13. FIG. 4A is a plan view of the recessed portion. Furthermore, FIG. 4B is a perspective view of the recessed portion. The recessed portion 131 is the portion that corresponds to the inner side of the area which is indicated in FIG. 4A. Here, the recessed portion 131 and the boss 133 have the same structure as the recessed portion 132 and the boss 134; therefore, an explanation is given by using the recessed portion 131 and the boss 133 as an example.

As illustrated in FIG. 4A, the recessed portion 131 includes a slope face 101, represented by multiple circles, a bottom face 102, the screw hole 103, and a cutout 104. For easy understanding, the recessed portion 131 is illustrated by indicating the area of the recessed portion 131 in FIG. 4. Furthermore, as illustrated in FIGS. 4A and 4B, the slope face 101 has a slope that is recessed toward the back surface, i.e., that is recessed deeply in a direction away from the liquid crystal unit 12. Furthermore, the recessed portion 131 does not have any slope when it reaches the bottom face 102 so that it becomes a plain face. Moreover, the screw hole 103 is provided in the center of the bottom face 102. The screw hole 103 is a through-hole, and it is the screw hole that is provided on the boss 133.

Furthermore, in the recessed portion 131 according to the present embodiment, the cutout 104 is provided at the position where the slope face 101 is included. Here, as described later, the recessed portion 131 receives a pressing force from the boss 133. At that time, the slope face 101 is bent, whereby the recessed portion 131 acts to reduce the pressing force. Therefore, it is preferable that the slope face 101 has a more flexible structure. Therefore, according to the present embodiment, the cutout 104 is provided at the position where the slope face 101 is included so that the area of the slope face 101 is easily bent. According to the present embodiment, the cutout 104 is a through-hole.

Figure 5:
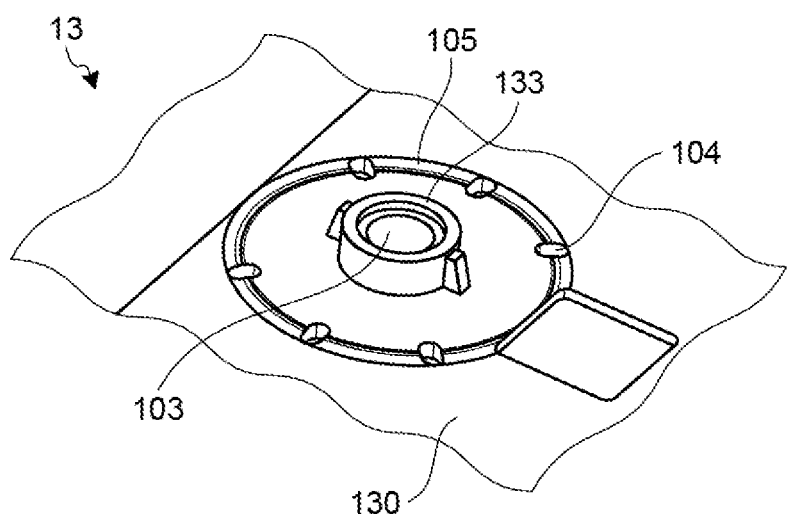
FIG. 5 is a perspective view of a boss.

FIG. 5 is a perspective view of the boss. The boss 133, illustrated in FIG. 5, is provided on the back surface of the recessed portion 131 in the plate portion 130. The boss 133 protrudes toward the substrate 14. Specifically, the boss 133 protrudes in the thickness direction of the first inner cover 13 at the position where the boss 133 is provided. Furthermore, the boss 133 includes the screw hole 103. As described above, the screw hole 103 is a through-hole that passes through the recessed portion 131. Furthermore, the periphery of the boss 133 is raised toward the substrate 14 due to a slope face 105. The slope face 105 is at the opposite side of the slope face 101 of the recessed portion 131. Moreover, the cutout 104 is provided at the position where the slope face 105 is included. The boss 133 is an example of a "protruding portion".

Next, with reference to FIGS. 6 and 7, an explanation is given of an operation in a case where the pressing force is applied to the tablet-type PC according to the present embodiment. FIG. 6 is an enlarged view of the boss section, taken along the line A-A' in FIG. 1A. Furthermore, FIG. 7 is an enlarged view of the boss section, taken along the line A-A' in FIG. 1A in a state where the pressing force is applied. For easy understanding, the recessed portion 131 is illustrated by indicating the area of the recessed portion 131 in FIGS. 6 and 7.

As illustrated in FIG. 6, a screw 200 passes through the second inner cover 15 and the substrate 14 from the side of the external cover 16 so as to be engaged with the screw hole 103 that is provided in the boss 133 of the first inner cover 13. Here, for easy illustration, the screw 200 and the screw hole 103 are depicted with their screw threads omitted from FIG. 6. In actuality, a state is such that the screw threads of the screw 200 and the screw hole 103 are engaged and are in contact with one another. Furthermore, as FIG. 6 is an enlarged view, the first inner cover 13 and the plate portion 130 become one; however, for easy understanding, the reference numeral of each of them is depicted.

The first inner cover 13 and the second inner cover 15 are fastened due to the engagement between the screw 200 and the screw hole 103. Furthermore, the substrate 14 is fixed such that it is sandwiched between the boss 133 and the second inner cover 15.

In the above state, on the front surface of the plate portion 130 of the first inner cover 13, i.e., the surface that is opposed to the liquid crystal unit 12, the recessed portion 131 is recessed in a direction toward the back surface. Specifically, the plane that is on the same level as the front surface of the first inner cover 13 is indicated by a two-dot chain line S, and the recessed portion 131 is recessed toward the substrate 14 from the two-dot chain line S as illustrated in FIG. 6. Furthermore, the entire front surface of the plate portion 130 has a gap with the liquid crystal unit 12, and the gap with the liquid crystal unit 12 is increased as the recessed portion 131 is recessed.

In the above state, for example, if a pressing force P is applied to the area of the external cover 16, which corresponds to the screw 200, toward the liquid crystal unit 12, the area of the slope face 101 of the recessed portion 131 is largely bent and is moved closer to the liquid crystal unit 12, as it is more flexible due to the cutout 104 than the other areas. In addition, the plate portion 130 of the first inner cover 13 is pressed toward the liquid crystal unit 12, and the front surface of the plate portion 130 is moved toward the liquid crystal unit 12, whereby the state is obtained as in FIG. 7.

In this state, the plate portion 130 of the first inner cover 13 abuts the liquid crystal unit 12 at positions Q1 and Q2 that are the edge portions of the recessed portion 131. Here, as FIG. 7 is a cross-sectional view, only the two contact areas, i.e., the positions Q1 and Q2, are illustrated; however, in actuality, the entire outer edge of the recessed portion 131 abuts the liquid crystal unit 12.

In this way, if the pressing force P is applied, the force is distributed to the outer edge of the recessed portion 131; therefore, the force for pressing the liquid crystal unit 12 is reduced. Thus, it is possible to reduce the occurrence of failure of the liquid crystal unit 12.

Here, according to the present embodiment, the mechanism is provided to release the applied force by bending the slope face 101 of the recessed portion 131; however, if the applied force is sufficiently released by receiving it at the outer edge of the recessed portion 131, the slope face 101 may be less bent.

Furthermore, according to the present embodiment, to release the force effectively, the boss 133 and the recessed portion 131 are provided such that the position at the opposite side of the boss 133 is in the center of the recessed portion 131. However, in a case where the efficiency of releasing the force may be low, e.g., the liquid crystal unit 12 is unlikely to be damaged, it is appropriate as long as the position at the opposite side of the boss 133 is included in the recessed portion 131. In this case, it is preferable that the positional relationship between the boss 133 and the recessed portion 131 is determined in consideration of how the force applied to the boss 133 is applied to the outer edge of the recessed portion 131 and the strength of the liquid crystal unit 12.

Furthermore, it is preferable that the size of the recessed portion 131 is larger in consideration of more distribution of the force; however, if the size of the recessed portion 131 is larger, there is a high possibility that the opposite side of the boss 133 is brought into contact with the liquid crystal unit 12 due to the bend of the recessed portion 131. Furthermore, as the recessed portion 131 is bent to release the applied force, it is preferable that the recessed portion 131 is easily bent; however, if it has a structure to be largely bent, there is a high possibility that the opposite side of the boss 133 is brought into contact with the liquid crystal unit 12 due to the bend. Moreover, the deepness of the recess of the recessed portion 131 is limited by the size of the tablet-type PC 1. Therefore, it is preferable that the size and the flexibility of the recessed portion 131 are determined on the basis of the deepness of the recess of the recessed portion 131, the degree of force that may be tolerated by the liquid crystal unit 12, or the like.

Figure 8A:
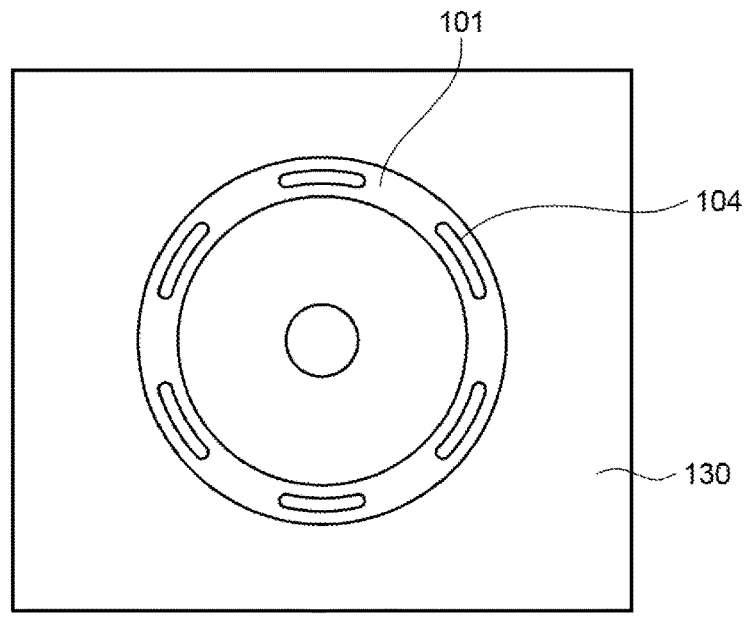
FIG. 8A is a diagram that illustrates another example of the cutout.
Figure 8B:
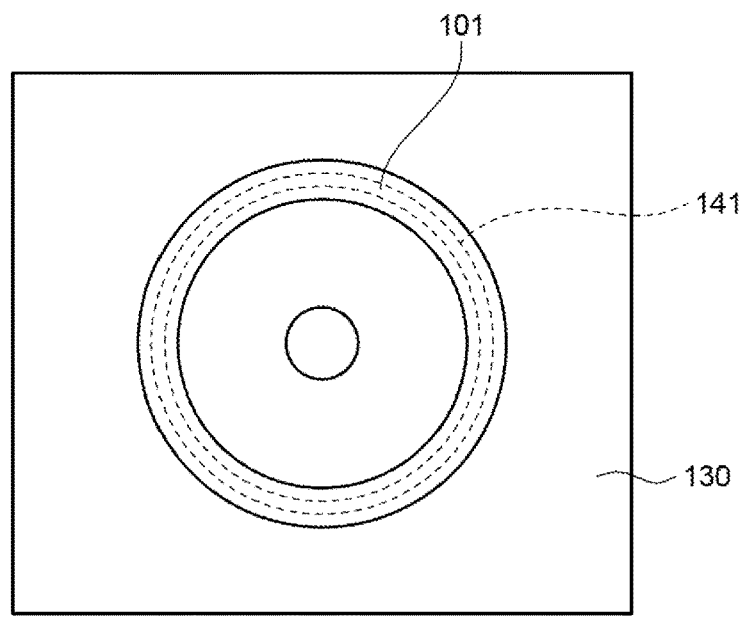
FIG. 8B is a diagram that illustrates another example of the cutout.

Furthermore, the first inner cover 13 according to the present embodiment uses the cutout 104 that extends in the slope direction of the slope face 101; however, the cutout may have any shape as long as it makes the slope face 101 easily bend. For example, as in FIG. 8A, it is possible to provide the cutout 104 that extends in a direction perpendicular to the slope direction of the slope face 101. Furthermore, it is possible that the cutout 104 has a different shape of a through-hole. For example, as in FIG. 8B, it is possible to provide, as the cutout 104, a groove 141 that extends in a direction perpendicular to the slope direction of the slope face 101. FIGS. 8A and 8B are diagrams that illustrate other examples of the cutout.

Furthermore, according to the present embodiment, the slope face 101 is easily bent by using the cutout 104; however, another structure may be used as long as it is a structure that makes the slope face 101 easily bend. For example, an area of the slope face 101 is made thin so that it is easily bent.

Furthermore, according to the present embodiment, the slope face 101 is easily bent; however, it is appropriate as long as the force is released by bending the recessed portion 131 and, for example, the bottom face 102 may be easily bent.

Furthermore, in the present embodiment, an explanation is given of a case where the outer edge of the recessed portion 131 is circular to improve the force distribution efficiency; however, the shape of the recess may be a different shape and it may be, for example, a triangle or a square. Furthermore, it is preferable that a vertex is curved so as to prevent a strong force from being applied to a specific area.

Furthermore, in the present embodiment, an explanation is given by using, as the protruding portion, the boss 133 that is engaged with the screw 200 that includes the screw hole. However, there is no limitation on the boss 133 as long as it is a protruding portion with which, if the force is applied in a direction from the external cover 16 toward the liquid crystal unit 12 at a position other than the vicinity of the outer edge of the liquid crystal unit 12, the force is applied in a concentrated manner and the opposite side is likely to be in contact with the liquid crystal unit 12. For instance, it may be a support rod that supports between the first inner cover 13 and the second inner cover 15. In such a case, a recessed portion may be provided on the surface of the first inner cover 13, opposing to the liquid crystal unit 12, in the area that includes the position at the opposite side of the support rod.

Furthermore, in the present embodiment, an explanation is given by using, for example, the tablet-type PC 1; however, this is not a limitation on the target to be used. If a product is structured such that there is a possibility that, if it is provided on the back surface of the liquid crystal unit 12 and if force is applied, it is brought into contact with the back surface of the liquid crystal unit 12, the cover that includes the protruding portion and the recessed portion, described in the present embodiment, is used for the product, whereby the same advantage may be obtained.

As described above, in the chassis according to the present embodiment, if the force toward the back surface of the liquid crystal unit is applied to the boss section, the force applied to the boss is distributed to the outer edge of the recessed portion, whereby it is possible to reduce the force that is applied to the liquid crystal unit, and it is possible to prevent the occurrence of failure of the liquid crystal unit due to the contact with the protruding portion.

According to an aspect of the chassis and the electronic device that are disclosed in the present application, an advantage is produced such that it is possible to prevent the occurrence of failure of the liquid crystal unit due to the contact with the boss.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A chassis comprising:
    a plate portion, the plate portion includes:
        a first surface that is opposed to a back surface of a liquid crystal unit such that any part is not arranged between the first surface and the back surface;
        a second surface that is a surface at an opposite side of the first surface;
        a protruding portion that extends from the second surface in a direction away from the back surface of the liquid crystal unit and in a thickness direction of the plate portion; and
        a recessed portion that has a predetermined area of the first surface recessed, including an area of the first surface at an opposite side of the protruding portion, includes a slope face and a bottom face to form a recess, and has a plurality of cutouts which is provided at a position where the slope face is included.

2. The chassis according to claim 1, wherein, in the recessed portion, the area of the first surface at the opposite side of the protruding portion is located in a center of the predetermined area.

3. The chassis according to claim 1, wherein the recessed portion is circular.

4. The chassis according to claim 1, wherein the recessed portion is more flexible than other areas of the plate portion.

5. The chassis according to claim 1, wherein the protruding portion is a boss that includes a screw hole.

6. The chassis according to claim 1, wherein the protruding portion is located at an area other than vicinity of an outer edge of the back surface of the liquid crystal unit.

7. An electronic device comprising:
    a liquid crystal unit;
    a substrate; and
    a chassis, the chassis includes:
        a plate portion that is sandwiched between the liquid crystal unit and the substrate and that includes a first surface that is opposed to a back surface of the liquid crystal unit such that any part is not arranged between the first surface and the back surface and a second surface that is a surface at an opposite side of the first surface and that is opposed to the substrate;
        a protruding portion that extends from the second surface in a direction away from the back surface of the liquid crystal unit and in a thickness direction of the plate portion; and
        a recessed portion that has a predetermined area of the first surface recessed, including an area of the first surface at an opposite side of the protruding portion, includes a slope face and a bottom face to form a recess, and has a plurality of cutouts which is provided at a position where the slope face is included.

* * * * *